B. HOLT.
LINK TREAD TRACK.
APPLICATION FILED DEC. 7, 1916.
1,327,556.
Patented Jan. 6, 1920.
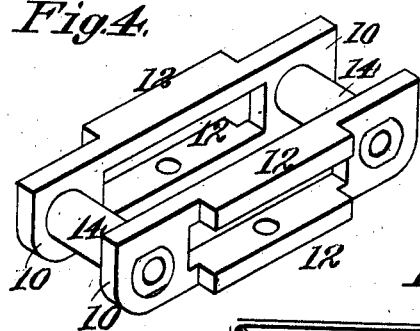
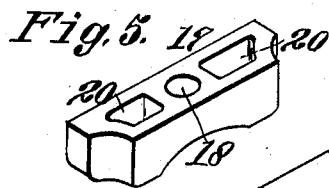
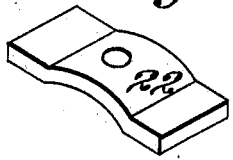
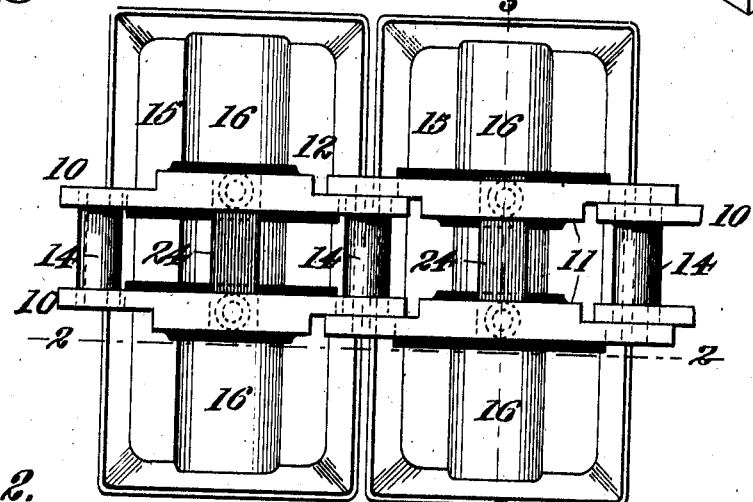
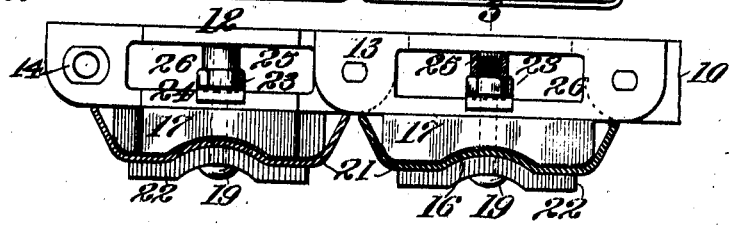
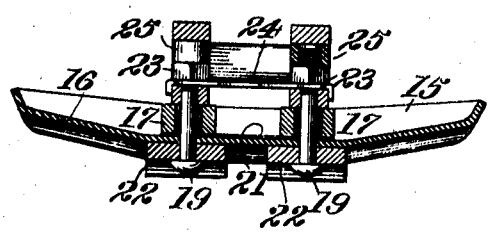
WITNESSES:
Charles Rickles
Julius Benesch
INVENTOR
Benjamin Holt
BY Strong & Townsend
ATTORNEYS

UNITED STATES PATENT OFFICE.

BENJAMIN HOLT, OF STOCKTON, CALIFORNIA.

LINK TREAD-TRACK.

1,327,556.   Specification of Letters Patent.   Patented Jan. 6, 1920.

Application filed December 7, 1916. Serial No. 135,530.

*To all whom it may concern:*

Be it known that I, BENJAMIN HOLT, a citizen of the United States, residing at Stockton, in the county of San Joaquin and State of California, have invented new and useful Improvements in Link Tread-Tracks, of which the following is a specification.

This invention relates to endless link tracks employing roller trucks and has for its object to strengthen and improve the construction of the same.

The track link construction here shown is related to the subject-matter of my co-pending application, Serial Number 115,071, filed on or about August 15, 1916. The present track is designed particularly for heavy duty and comprises essentially parallel track links having a rail head on one longitudinal edge and a flange on its opposite lower edge for support and for connection to a transversely extending tread plate. These tread plates are usually of heavy stamped sheet-metal, and with an irregular inner surface, so that it ordinarily requires the track links to be specially shaped to fit the inside of the tread plate. In the present structure, I employ filler-pieces or pillow blocks shaped to conform with the inner faces of the tread plates and having a flat top surface on which the flat inside of the track link may rest; the pillow block forming a long bearing for the track link; adding strength and stability to the track link and tread plate and allowing the track links to be made economically and quickly. (In my former application Serial No. 115,071, it is necessary to draw out the lower edge of the track link and to shape it to conform to the inner surface of the tread plate. While that construction is all right for light tracks, and similar types of traction engines, it does not give the strength to the track link that is necessary in heavy duty work, and which added strength is given by the present construction.) Also, as a means for giving additional strength to the present construction, I employ reinforcing plates on the outside of the tread plate and bolt the track links, pillow blocks, tread plate and outside reinforcing plates together into a rigid structure. Another feature of the present invention is the interposition of a suitable filler, such for example as paper, between the pillow blocks and the tread plate giving a slight amount of yield when the bolt is drawn up by its nut and insuring a tight connection. Another feature which adds strength to the present track link construction, is the positioning of the upper threaded end of the securing bolt within the track link, so that the bolt or a part that may be attached thereto, rests directly against the rail head which bridges the opening in the track link.

These features, and others, will be made apparent hereinafter.

Having reference to the accompanying drawings—

Figure 1 shows a plan view portion of the track.

Fig. 2 shows a vertical sectional view of the same taken on line 2—2 of Fig. 1.

Fig. 3 shows a cross sectional view taken on line 3—3 of Fig. 1.

Fig. 4 shows a perspective view of the link detached.

Fig. 5 shows a perspective view of one of the filler pieces.

Fig. 6 shows a perspective view of one of the grouser and reinforcing plates.

The endless track is made up of a series of articulated link sections each embodying a pair of parallel side bars 10. Each bar has a struck-up flange 11 at its inner longitudinal edge and a similar flange 12 at its outer longitudinal edge, formed by punching and pressing the material of the central portion of the body of the bar into position at right angles to the vertical plane of the bar and in a plane with the adjacent longitudinal edge thereof. While the ends of adjacent links of the track are of different width and said links have their flanges extending in different directions, as shown in Fig. 1, only one form of side bar 10 is necessary. Alternate links are formed by detachably connecting parallel side bars by gudgeon pins 14 entering elongated openings in the ends of the bars. The side bars of this link are positioned so that their flanges extend outwardly away from each other, while intermediate links, or those connecting with the ones already described, have their side bars reversely arranged so that the flanges extend inwardly or toward each other. The connection between successive links is made by journal pins 13 secured in the side bars and passing through axial openings in the gudgeon pins 14. Adjacent links have their side bars overlapping so that the flanges 11 in coaction with the overlapping ends of the adjacent links produce a continuous track to receive and support the roller truck mechanism of the tractor, or other vehicle.

Each of the links carries a shoe 15, said shoe being formed of pressed metal and made concavo-convex, with a central, transversely extending arched portion 16, forming a rib on the interior, and a central channel on the exterior of the shoe. Lying between each of the side bars or rail sections 10 of the link, and engaging the bottom of the shoe and conforming to the curvature thereof and forming a seat for a rail section, is a cast iron filler piece 17, Fig. 5, having its inner longitudinal edge terminating substantially in a plane with the edges of the shoe so that the overlying rail section may rest with its flange 12 directly upon the filler piece and have its ends project over the edges of the shoe. Each of the filler pieces has a central, vertical opening 18 to receive a fastening bolt 19, and it may be cored out at either side of the central opening as shown at 20, for the purpose of reducing weight and material.

Between each filler piece and the shoe I arrange a shim 21, of paper or other slightly compressible material forming a tensioning member to allow the bolts to be drawn up tight. On the exterior of the shoe underlying each rail section 10 and filler piece 17 is a reinforcing and grouser plate 22, of comparatively heavy metal curved to fit the channel of the arch 16 of the shoe, and extending parallel with the track.

Preferably a cross-piece 24 extends between each pair of rail sections of each link, overlying the flanges 12, and is held in place by the bolts 19; the nuts 23 being seated directly thereagainst. The cross-piece 24 has its ends bent down over the outside of the flanges 12, thus holding the side bars firmly against any tendency to spread apart.

Bolt 19 is the sole means of fastening each rail section and associated parts together; extending vertically through the exterior plate 22, shoe 15, filler piece 17, and flange 12, with its head countersunk in the exterior plate 22 and clamped in place by means of the nut 23 at the inner end of the bolt.

Integral with each of the nuts 23 and engaging the overlying flange 11 of each side bar, is a hollow supporting block or sleeve 25 surrounding the end of the bolt 19, and bearing against the rail head portion 11, and thereby serving to support the same, which bridges the opening 26 in the link.

The present link is exceptionally strong and rigid and is capable of being manufactured at a cost small in comparison with prior links used for the same purpose. The punching of the side bars to form top and bottom symmetrical flanges of the finished rail sections effects a saving in manufacture and provides an open-sided link that has advantages in the way of permitting mud and dirt to escape. The rail sections are identical in size and shape, being merely transposed and differently assembled for male and female links. The cast iron fillers simplify the construction of the links inasmuch as the rail sections can be made straight at the bottom or outer longitudinal edge, although the shoe 15 upon which they rest is generally concaved and irregular in shape. These filler pieces or pillows, effectively prevent denting or collapsing of the pressed metal shoe, and are simple and economical to manufacture. The exterior plates 22 lend additional reinforcing and wearing qualities to the shoes as well as providing ground engaging lugs or grousers therefor, against side slip. The paper shims between the filler pieces and shoe serve to maintain a constant tension upon the bolts and effectually bind the nuts in place, eliminating thereby any possibility of play which would result in shearing of the bolts.

Various changes in the construction and arrangement of the several parts herein shown and described may be employed without departing from the spirit of my invention, as disclosed in the appended claims.

Having thus described my invention, what I claim and desire to secure by Letters Patent is—

1. An endless track section comprising a pair of parallel open-sided rail members having rail heads on one side, pillow blocks on which the other side of said members rest, tread plates supported against the pillow blocks, and bolts passing through the tread plates, pillow blocks and lower portions of the track members, and operating to form a bridge for the rail head portion of the rail members.

2. A link for endless tracks, comprising a tread plate, pillow blocks conforming thereto, rail sections resting on the pillow blocks, bolts passing through the tread plates, pillow blocks and rail sections, and a paper or equivalent shim member interposed between the pillow blocks and tread plates.

3. A link for endless tracks, comprising a tread plate, pillow blocks conforming thereto, rail sections resting on the pillow blocks, bolts passing through the tread plates, pillow blocks and rail sections, and a paper or equivalent shim member interposed between the pillow blocks and tread plates, said bolts having nuts adapted to support the underside of the rail heads of said rail sections.

4. An endless link track for roller trucks mechanism, comprising a series of articulated link-sections, each link being made up of parallel side-bars having straight longitudinal edges with top and bottom flanges projecting laterally therefrom and in a plane therewith, a concave shoe, a separate filler block inserted in the shoe and extending above the marginal edge thereof for receiving the side-bars and a flexible filler element interposed between the block and the shoe.

5. A track link comprising a pair of parallel side-bars having straight longitudinal edges with top and bottom flanges projecting laterally therefrom and in a plane therewith, a concave shoe carried by the side-bars, a filler block interposed between the shoe and the side-bars and upon which the side-bars rest, a non-metallic filler sheet interposed between the block and the shoe and a bolt extending through the bottom flange of each of said bars, then through the filler block and thereafter entering and engaging the shoe for securing all of said parts in their assembled relation.

6. A link section for an endless link track embodying parallel side bars having straight longitudinal edges and top and bottom flanges punched out from the body portion and lying in a plane with the adjacent longitudinal edge of the bar, removable bracing means between the top and bottom flanges of the side bars, a concave shoe, and a filler piece inserted in the shoe and extending above the marginal edges thereof to receive the side bars.

7. A link section for an endless link track embodying parallel side bars having top and bottom flanges lying in a plane with the adjacent longitudinal edges of the bar, a concave shoe for each link, and a cast iron block between each side bar and the shoe completely filling the concavity in the latter.

8. A link section for an endless link track embodying parallel side bars having top and bottom flanges lying in a plane with the adjacent longitudinal edges of the bar, a concave shoe, a separate filler block lying between the shoe and each side bar, and a bolt extending through the bottom flange of each bar through the filler and entering the shoe for connecting the parts together.

9. A link section for an endless link track embodying parallel side bars having top and bottom flanges lying in a plane with the adjacent longitudinal edges of the bar, a concave shoe, a filler lying between the shoe and bars, a bolt extending through the bottom flange of each bar through the filler and entering the shoe for connecting the parts together, and a paper shim between the filler and the shoe for providing a constant tension upon the bolts.

10. A link section for an endless link track comprising side bars, a pressed metal shoe carried thereby, said shoe having transversely extending corrugations on the bottom thereof, and a reinforcing plate on the exterior of the shoe below each side bar, said reinforcing plates being curved to conform to the shape of the shoe and serving also as grousers.

11. A link section for endless link tracks, embodying parallel side bars, a corrugated shoe carried thereby, fillers between the shoe and side bars, a reinforcing plate on the exterior of the shoe below each filler and side bar and conforming to the curvature of the shoe, and serving also as grousers.

12. A link section for endless link tracks embodying parallel side bars, a shoe carried thereby, a filler piece between the shoe and each side bar, a reinforcing plate on the exterior of the shoe below each filler piece and side bar, and serving also as grousers, and a bolt extending through each exterior plate, shoe, filler piece and side bar for fastening the parts together.

13. A link section for endless link tracks comprising parallel side bars each formed with straight longitudinal edges having top and bottom flanges punched from the body portion thereof, and lying in a plane with the adjacent longitudinal edge of the bar, a shoe carried by said bars, and fastening means engaging the bottom flanges of the side bars for detachably securing the shoe in place, said means comprising bolts, and nuts having extensions forming braces between the top and bottom flanges of the side bars.

In testimony whereof I have hereunto set my hand in the presence of two subscribing witnesses.

BENJAMIN HOLT.

Witnesses:
DAN N. GILINSIE,
C. L. NEUMILLER.